Nov. 3, 1925.
G. M. BALL
1,560,366
PARACHUTE HARNESS
Filed July 25, 1924
3 Sheets-Sheet 1
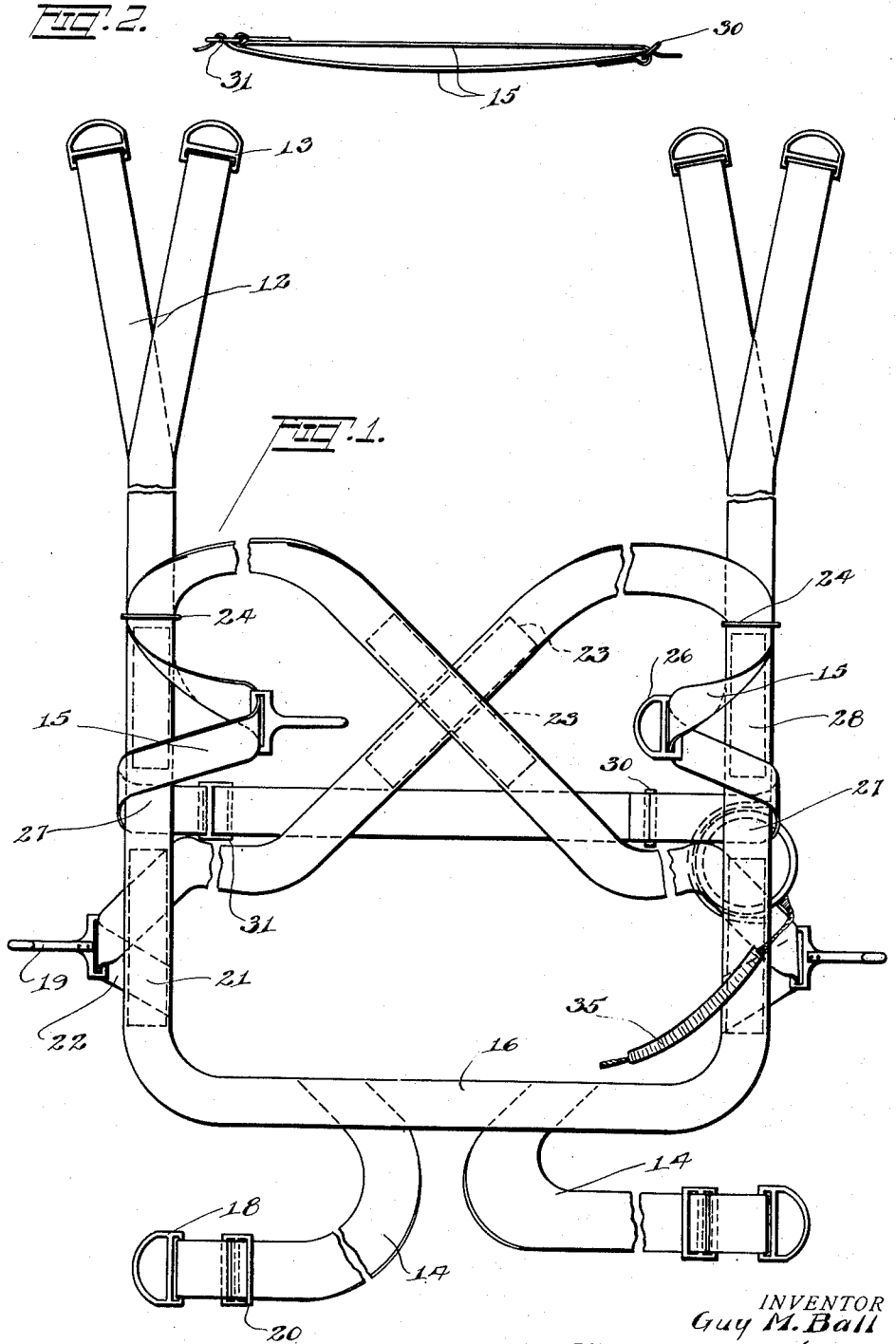
INVENTOR
Guy M. Ball
BY
Robert H. Young
ATTORNEY

Nov. 3, 1925.

G. M. BALL 1,560,366

PARACHUTE HARNESS

Filed July 25, 1924

INVENTOR
Guy M. Ball
BY Robert A. Young
ATTORNEY

Patented Nov. 3, 1925.

1,560,366

UNITED STATES PATENT OFFICE.

GUY M. BALL, OF DAYTON, OHIO, ASSIGNOR TO IRVING AIRCHUTE COMPANY, INC., OF BUFFALO, NEW YORK, A CORPORATION OF NEW YORK.

PARACHUTE HARNESS.

Application filed July 25, 1924. Serial No. 728,113.

*To all whom it may concern:*

Be it known that I, GUY M. BALL, a citizen of the United States, residing at Dayton, in the county of Montgomery and State of Ohio, have invented certain new and useful Improvements in Parachute Harness, of which the following is a specification.

This invention relates to improvements in parachute harnesses.

The principal object of the invention is to provide a parachute harness capable of a wide range of adjustment to accommodate the harness to considerable differences in stature of different aviators.

Heretofore parachute harnesses were provided capable only of minor adjustments, which made it necessary to keep on hand quite a number of parachute harnesses and packs for the various flyers, each flyer being measured for his individual pack. This involves considerable expenses in the provisioning of a flying unit, and it is therefore desirable to have a parachute harness of the type herein contemplated, made of a size to fit an aviator of medium stature and be capable of adjustment one way or another, to accommodate aviators of different statures. The harness is so constructed that such adjustment is permitted, although the point of suspension of the wearer is maintained in its proper place just in front of the shoulders. Provisions are also made so that it is practically impossible for the wearer to slip out of the harness unless he releases the catches purposely. A single hook fastener may thus be used to quickly enable the aviator or wearer to release himself entirely from the body harness and the two leg straps are the only other fastening means besides the single body harness hook, which fastens him within the harness.

The foregoing objects and other objects having reference to details of construction of a parachute harness are brought out in the following specification, in which reference is made to the accompanying drawing.

In the drawing, Fig. 1 is a layout view of a parachute harness detached from its pack, with the various parts shown in a manner to indicate the method of application to the person of the aviator, and in a manner most clearly to illustrate the method of adjustment.

Fig. 2 is an isolated plan view of the adjustment for the body harness.

Fig. 3 is a view showing the manner of wearing the parachute harness.

Figure 4:
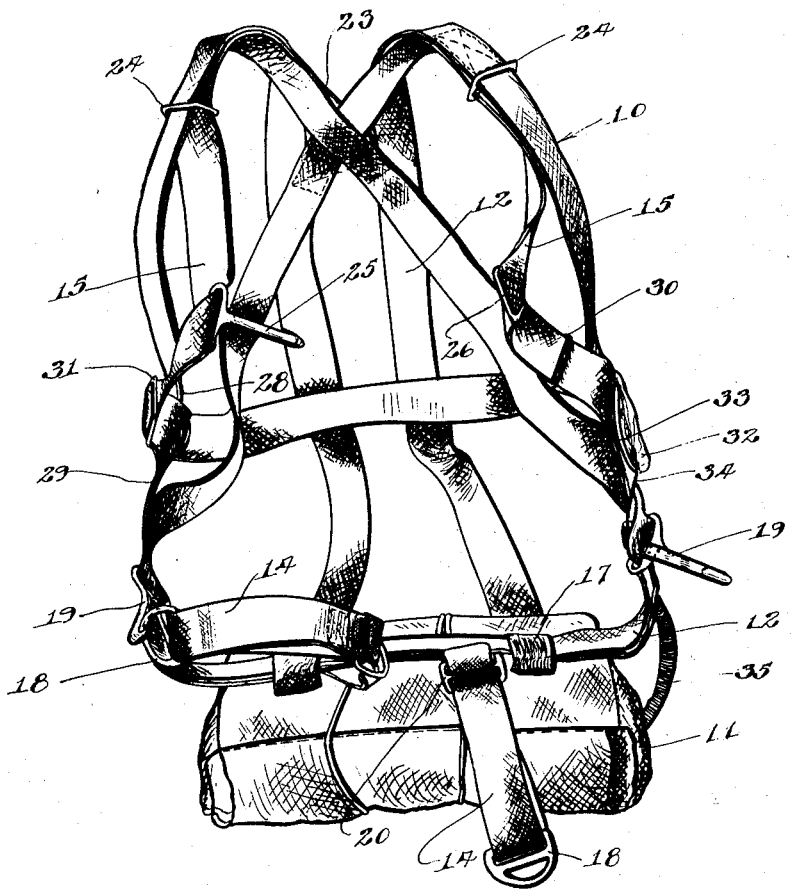
Fig. 4 is a view similar to Fig. 3, but with the harness apart from the aviator.

The parachute harness of the present invention is designed for use in connection with the standard service type of parachute packs used in the United States Army and Navy. These may be of the lap or seat type, or of the back or chest type. In the present case the parachute harness 10 is shown used in connection with the seat pack 11. The harness comprises a suspension rigging formed by a pair of straps 12 which in the open position of the parachute extend vertically upwardly, connected by D rings 13 with the shrouds of the parachute, and forming a sling support between the vertically extending suspension straps. Before the opening of the parachute, the straps 12 extend into the pack 11 in which the parachute is folded and packed. In the case of the seat type pack, these straps then extend down the aviator's back. The aviator is harnessed in the suspension rigging by leg straps 14 and shoulder straps 15. The leg straps 14 are sewed to the suspension straps 12, as at 16, at about the point where the pack 11 is fastened to the straps 12 as shown at 17 in Fig. 4. The straps 14 are fitted with D rings 18 which are joined to snap fasteners 19 after the straps 14 are extended through the crotch and about the thighs in the manner shown in Fig. 3. The straps 14 have adjustable buckles 20 through which the straps 14 pass frictionally, so that the length of the straps may be varied to fit different aviators.

The shoulder straps 15 are doubled over at their one end and sewed as at 21 on the straps 12, thus leaving loops 22 for the reception of the snap fasteners 19. The two shoulder straps 15, together with the waist strap are really a single continuous strap as easily seen in Fig. 3. The straps 15 extend in criss-crossed relation across the aviator's back and in the middle of the back have a slip connection, by the interlooping of pieces 23 sewed onto the criss-crossed straps 15. The slip connection thus ties the two strap portions 15 together, the connections however being freely adjustable by the predetermined limits to accommodate for body movements. The straps extend over the shoulders and have a slip connection with the straps 12 through the medium of rings 24. Below this point the strap portions 15 are joined across the chest by a snap fastener 25 and a D ring 26, which may be slipped along the straps 15. The straps then extend through loops 27 provided by the straps 12 by the sewing together of the straps 12 at the points 28 and 29. The free ends of the straps 15 are overlapped about the aviator's back and a buckle 30 secured on the end of one of the straps may be frictionally adjusted along the other strap, while a buckle 31 on the free end of the last mentioned strap is adjusted frictionally along the first mentioned strap. The manner of accomplishing the adjustment is perhaps best shown in Fig. 2, showing a plan view of this portion of the harness. This adjustment in contradistinction to the adjustment of the strap, 14, serves to vary the overall size of the body harness whereas the adjustment of the straps 14 is merely a local adjustment. The purpose for this will be apparent. The major portion of the adjustment of the parachute harness as a whole must occur in the body harness, since it is in the body measurements that aviators differ most appreciably. A parachute harness if not properly fitted in this portion is most troublesome. If the straps fit too loosely or too tightly about the body, they give discomfort in either case, and in case they are too loose catch onto things as the aviator climbs into and out of the cockpit, or may, in an extreme case, result seriously if the aviator is called upon to use his parachute. The straps 15 will be provided to fit an aviator of medium stature and sufficient lee-way is provided by the adjustment afforded so that the parachute harness can be used by quite a number of aviators differing considerably in stature.

It will now be clear that a continuous strap with a single take-up for varying its length is used to form, not only the shoulder and back strap, but also the waist strap across the small of the back, and the connection across the chest. Both the waist strap and the chest connections must be nicely proportioned to fit the wearer, otherwise it might be possible to slip out of the harness when the parachute opens and the wearer takes a shock of the opening. A single hook fastener forms the sole means for fastening the aviator within the body harness. The point of suspension of the wearer is another important point in a suspension harness of this kind, for by interconnecting the suspension straps and the shoulder straps by the adjustable interconnection shown, the wearer regardless of his size and of the effective length to which the body harness strap has been adjusted, may so position the adjustable interconnections 24 that he is suspended from points in front of each shoulder. This point has been found to be very desirable to permit the aviator to land in an upright position. The waist strap is vertically located at the side of the aviator by reason of the slip connection through the suspension straps at 27; and the fixed location of these points 27 is another feature which greatly assists in retaining the wearer when the shock of the opening of the parachute is applied.

The pocket shown at 32 which is usually provided on the straps 12 receives the ring 33 attached to the end of the rip cord 34 extending through the flexible conduit 35 to the pack 11. The pocket 32 is preferably sewed on adjacent to point 21 where the straps 15 are sewed to the straps 12 where the ring 33 will be conveniently reached by the different aviators.

I claim:

1. In a parachute harness, a parachute suspension rigging, comprising suspension straps extending from the parachute and passing in front of the aviator and beneath the aviator's seat in the form of a sling, a body harness consisting of a single continuous strap having its two ends connected to the lower portions of the upright portions of the said sling, and a single quick releasable fastening device to connect the parts of said body harness together in front of the aviator to retain him securely within the said body harness.

2. In a parachute harness, a parachute suspension rigging comprising suspension straps extending from the parachute and passing in front of the aviator and beneath the aviator's seat in the form of a sling, a body harness consisting of a single continuous strap having its two ends connected to the lower portions of the upright portions of said sling, said continuous strap passing horizontally along the aviator's back, upwardly along both sides in front of the aviator, over the shoulders and crossing itself in back of the aviator, and a single quick releasable fastening device to connect the upwardly extending front portions of said continuous strap together in front of the aviator to secure him within the body harness.

3. In a parachute harness, a parachute suspension comprising suspension straps extending from the parachute and passing in front of the aviator and beneath the aviator's seat in the form of a sling, a body harness consisting of a single continuous strap having its two ends connected to the lower portions of the upright portions of the said sling, a single quick releasable fastening device to connect the parts of said body harness together in front of the aviator to retain him securely within the said body harness, adjusting means to vary the effective length of said continuous strap and means to hold the body harness to the suspension sling at points adjacent the forward portions of the shoulders.

4. In a parachute harness, a parachute suspension rigging comprising suspension straps extending from the parachute and passing in front of the aviator and beneath the aviator's seat in the form of a sling, a body harness consisting of a single continuous strap having its two ends connected to the lower portions of the upright portions of the said sling, a single quick releasable fastening device to connect the parts of said body harness together in front of the aviator to retain him securely within the said body harness, and means to hold the body harness to the suspension straps at points adjacent the forward portions of the shoulders.

5. In a parachute harness, a parachute suspension rigging comprising suspension straps extending from the parachute and passing in front of the aviator and beneath the aviator's seat in the form of a sling, a body harness consisting of a single continuous strap having its two ends connected to the lower portions of the upright portions of the said sling, and a quick releasable single fastening device to connect the parts of said body harness together in front of the aviator to retain him securely within the said body harness, means adjustable along the body harness to hold the body harness to the suspension straps at points adjacent the forward portions of the shoulders, and means to adjust the effective length of said body harness.

6. In a parachute harness, a parachute suspension rigging comprising suspension straps depending from the parachute and passing in front of the aviator beneath the aviator's seat in the form of a sling, a body harness consisting of a strap having its two ends connected to the suspension straps, said straps extending over the aviator's shoulders and crossing itself at the back, and means to connect said crossed portions together, said means permitting free movement of said crossed portions relative to each other within predetermined limits.

7. In a parachute harness, a parachute suspension rigging comprising suspension straps extending from the parachute and passing downwardly in front of the aviator, a body harness consisting of a continuous strap having its ends connected to the lower portions of the upright portions of said suspension straps, said body harness extending over the aviator's shoulders and crossing itself at the back, means for adjusting the effective length of the body harness and means to connect said crossed portions of the body harness together to permit free movement of said portions relative to each other within predetermined limits.

8. In a parachute harness, a parachute suspension rigging comprising suspension straps extending from the parachute and passing in front of the aviator and beneath the aviator's seat in the form of a sling, a body harness consisting of a single continuous strap having its two ends connected to the lower portions of the upright portions of said sling, said continuous strap passing horizontally along the aviator's back, upwardly along both sides in front of the aviator, over the shoulders and crossing itself in back of the aviator, and a single quick releasable fastening device to connect the upwardly extending front portions of said continuous strap together in front of the aviator to secure him within the body harness, means to connect said crossed portions at the back of the aviator together to permit free movement of said portions relative to each other within predetermined limits, and a plurality of leg straps connected to said sling to pass about the aviator's thighs.

9. In a parachute harness, a parachute suspension rigging comprising suspension straps extending from the parachute and passing in front of the aviator, a body harness comprising a continuous strap having its two ends connected to the lower portions of said suspension straps, said continuous straps passing upwardly along both sides and in front of the aviator and crossing itself in back of the aviator, each upwardly extending front portion of the continuous strap having a running connection with a fastening device and a quick release hook for attaching said fastening devices together.

10. In a parachute harness, a parachute suspension rigging comprising suspension straps extending from the parachute and passing in front of the aviator and beneath him in the form of a sling, a body harness comprising a strap having its two ends connected to the lower portions of the upright portions of said suspension straps, said straps passing horizontally around the aviator's back to provide a waist portion, passing upwardly along both sides in front of the aviator over the shoulders and crossing itself in the back, said waist portion being vertically located at the side of the wearer by said suspension straps, and a single quick releasable fastening device to connect together vertically extending portions of said parachute harness at each side of and in front of the aviator.

11. In a parachute harness, a parachute suspension rigging comprising suspension straps extending from the parachute and passing in front of the aviator and beneath the aviator's seat in the form of a sling, a body harness consisting of a continuous strap having its two ends connected to the lower portions of the upright portions of said sling, said continuous strap passing horizontally around the aviator's back to provide a waist portion, upwardly along both sides in front of the aviator, over the shoulders and crossing itself in back of the aviator; each upwardly extending portion of said continuous strap having a running connection with a fastening device, a single quick release hook for attaching said devices together in front of the aviator, means for vertically locating said waist portion along the suspension straps, a pair of leg straps attached to said suspension straps, and an adjustable connection to attach the said upwardly extending portions of said continuous straps to the suspension straps adjacent the forward part of the shoulders of the aviator.

In testimony whereof I affix my signature.

GUY M. BALL.